US006704564B1

United States Patent
Lange et al.

(12)

(10) Patent No.: US 6,704,564 B1
(45) Date of Patent: Mar. 9, 2004

(54) METHOD AND SYSTEM FOR CONTROLLING MESSAGE TRANSMISSION AND ACCEPTANCE BY A TELECOMMUNICATIONS DEVICE

(75) Inventors: Rainer M Lange, Munich (DE); Robert A. Gee, Tempe, AZ (US); Axel Fuchs, Oak Park, IL (US); John E. Emrich, Bartlett, IL (US)

(73) Assignee: Motorola, Inc., Schaumburg, IL (US)

( * ) Notice: Subject to any disclaimer, the term of this patent is extended or adjusted under 35 U.S.C. 154(b) by 327 days.

(21) Appl. No.: 09/667,336

(22) Filed: Sep. 22, 2000

(51) Int. Cl.⁷ .............................................. H04M 11/10
(52) U.S. Cl. ................................ 455/412.1; 455/412.2; 701/24; 701/29; 701/117; 701/119; 712/223; 712/225; 340/7.2; 340/7.52
(58) Field of Search ................................ 455/67.1, 412, 455/426; 701/24, 29, 117, 119; 710/65; 712/223, 226, 225; 340/7.2, 7.52

(56) References Cited

U.S. PATENT DOCUMENTS

| 5,311,197 | A |   | 5/1994  | Sorden et al.  |         |
|-----------|---|---|---------|----------------|---------|
| 5,420,794 | A | * | 5/1995  | James          | 701/117 |
| 5,673,305 | A |   | 9/1997  | Ross           |         |
| 5,699,056 | A |   | 12/1997 | Yoshida        |         |
| 6,012,012 | A |   | 1/2000  | Fleck et al.   |         |
| 6,023,654 | A |   | 2/2000  | Mohlenkamp     |         |
| 6,028,537 | A |   | 2/2000  | Suman et al.   |         |
| 6,061,625 | A |   | 5/2000  | Fastenrath     |         |
| 6,092,020 | A |   | 7/2000  | Fastenrath et al. |      |
| 6,107,917 | A | * | 8/2000  | Carrender et al. | 340/505 |
| 6,112,152 | A | * | 8/2000  | Tuttle         | 701/115 |
| 6,266,608 | B1 | * | 7/2001 | Pertz          | 701/200 |
| 6,282,491 | B1 | * | 8/2001 | Bochmann et al. | 701/209 |
| 6,370,452 | B1 | * | 4/2002 | Pfister        | 701/23  |
| 6,405,361 | B1 | * | 6/2002 | Broy et al.    | 717/100 |
| 6,430,555 | B1 | * | 8/2002 | Gill et al.    | 707/4   |
| 6,459,967 | B1 | * | 10/2002 | Otto          | 701/29  |
| 6,505,100 | B1 | * | 1/2003 | Stuempfle et al. | 701/1 |
| 6,526,268 | B1 | * | 2/2003 | Marrah et al.  | 455/186.1 |
| 6,526,460 | B1 | * | 2/2003 | Dauner et al.  | 710/65  |
| 6,633,784 | B1 | * | 10/2003 | Lovelace et al. | 700/65 |
| 2001/0014863 | A1 | * | 8/2001 | Williams, III | 705/1 |
| 2002/0140545 | A1 | * | 10/2002 | Nietupski et al. | 340/5.72 |

FOREIGN PATENT DOCUMENTS

JP            2000123291 A   *   4/2000  ............ G08G/1/09

* cited by examiner

*Primary Examiner*—William Trost
*Assistant Examiner*—James D Ewart (57) ABSTRACT

A method for controlling message transmission by a telecommunications device (110). A trigger configuration signal (150) including a dynamic logic expression (160) is received by the telecommunications device (110). The dynamic logic expression (160) defines one or more conditions associated with the transmission of a message (140). The telecommunications device (110) applies the dynamic logic expression (160) and transmits the message (140) if the dynamic logic expression (160) is satisfied.

25 Claims, 5 Drawing Sheets

METHOD AND SYSTEM FOR CONTROLLING MESSAGE TRANSMISSION AND ACCEPTANCE BY A TELECOMMUNICATIONS DEVICE

FIELD OF THE INVENTION

This invention relates to telecommunications systems, in general, and to a method and system for controlling transmission and acceptance of messages by a telecommunications device, in particular.

BACKGROUND OF THE INVENTION

Telecommunications systems frequently comprise telecommunications devices programmed to automatically send and receive messages under various conditions. Telematics systems (for example (e.g.), General Motors Corporation's ONSTAR® system and Ford Motor Company's RESCU® system) are examples of such telecommunications systems. Telematics generally refers to an emerging area of automotive/transportation communications technology that combines wireless voice and data to provide location-specific security, information, productivity and/or in-vehicle entertainment services to drivers and passengers. The typical telematics system includes a number of in-vehicle telematics devices that are connected wirelessly to a central service center. The in-vehicle telematics device typically includes various vehicle inputs that receive data relating to vehicle conditions (e.g., engine status, wiper status, air bag status, vehicle speed, et cetera (etc.)), an input to receive information relating to vehicle position (e.g., a Global Positioning System (GPS) receiver or GLObal NAvigation Satellite System (GLONASS) receiver), and a data/cellular transceiver. The in-vehicle device communicates location-specific information to the service center, and in turn the service center communicates with each in-vehicle device to control the in-vehicle device and deliver telematics services to the driver and/or passengers via a cellular telephone.

Message filters and message triggers facilitate such automated communications by telecommunications devices. Message triggers control the transmission of messages by the telecommunications device by defining the conditions under which a message will be transmitted by the device. Message filters define the conditions under which a message will be accepted by the device. For example, telematics systems utilize message triggers and message filters to facilitate automated communications between many vehicle-installed telematics devices and a service center. Telematics devices are typically programmed with various message triggers and filters associated with conditions under which the device will transmit and accept messages to and from the service center.

The telematics function of compiling traffic information collected from vehicles having telematics devices provides an example of the use of message triggers and filters. For example, telematics devices installed on vehicles can be instructed by use of message triggers to send messages to a service center if the vehicle exceeds a certain speed or drops below a certain speed. By receiving such messages from various vehicles traveling in an area, the service center can compile data relating to traffic conditions in the area. Through the use of message filters, the service center can provide instructions via messages to certain on-board telematics devices. On-board devices having data inputs satisfying certain specified conditions will accept a message transmitted by the service center, while telematics devices installed in other vehicles will filter the message so as not to process or respond to it.

Telecommunications functions often require filters or triggers that are based on complex logical and arithmetic comparisons of combinations of two or more conditions. Thus far, expressions defining combinations of conditions that will initiate communications have generally been preprogrammed into the telecommunications device. Configuration of the filters and triggers has typically been handled by instructing the device to apply one or more factory-programmed expressions.

The major shortcoming of such systems is that they are limited by the preprogramming of the device. Expressions defining various combinations of filters or triggers that will initiate communications must be anticipated and programmed into the telecommunications device before it is deployed. These preprogrammed expressions generally cannot be readily updated because the devices typically communicate using narrow-bandwidth signaling channels. As such, the devices must be brought to a service center to be reprogrammed if the desired combinations of conditions covered by the programmed expression need to be modified. For many telecommunications functions, there is a great need for a system that can be continuously reconfigured with various logical combinations of message filters or triggers from a remote location. For example, information desired from a telematics device reporting traffic information may vary widely depending upon a number of factors, such as, the vehicle's location or speed, the time of day, etc. For example, it may be desirable for telematics devices installed on vehicles traveling on different roadways to have different vehicle speed triggers corresponding to the particular roadway or traffic condition. For such applications, it is particularly desirable to have a flexible telematics device that can be continuously reconfigured using message triggers and filter combinations to transmit and accept messages under varying circumstances. However, it is impractical to require deployed telematics devices to be returned to a service center for reprogramming in order to reconfigure message triggers and filters.

Accordingly, a need exists for a method and system for controlling a telecommunications device that allows telecommunications devices to be configured with numerous logical combinations of available filters and triggers without returning the device to a service center for reprogramming.

BRIEF DESCRIPTION OF THE DRAWINGS

The invention will be better understood from a reading of the following detailed description, taken in conjunction with the accompanying drawing figures in which.

For simplicity and clarity of illustration, the drawing figures illustrate the general manner of construction, and descriptions and details of well-known features and techniques are omitted to avoid unnecessarily obscuring the invention.

Furthermore, the terms first, second, third, fourth, and the like in the description and in the claims, if any, are used for distinguishing between similar elements and not necessarily for describing a sequential or chronological order. It is further understood that the terms so used are interchangeable under appropriate circumstances and that the embodiments of the invention described herein are capable of operation in other sequences than described or illustrated herein.

DETAILED DESCRIPTION OF THE DRAWINGS

Figure 1:
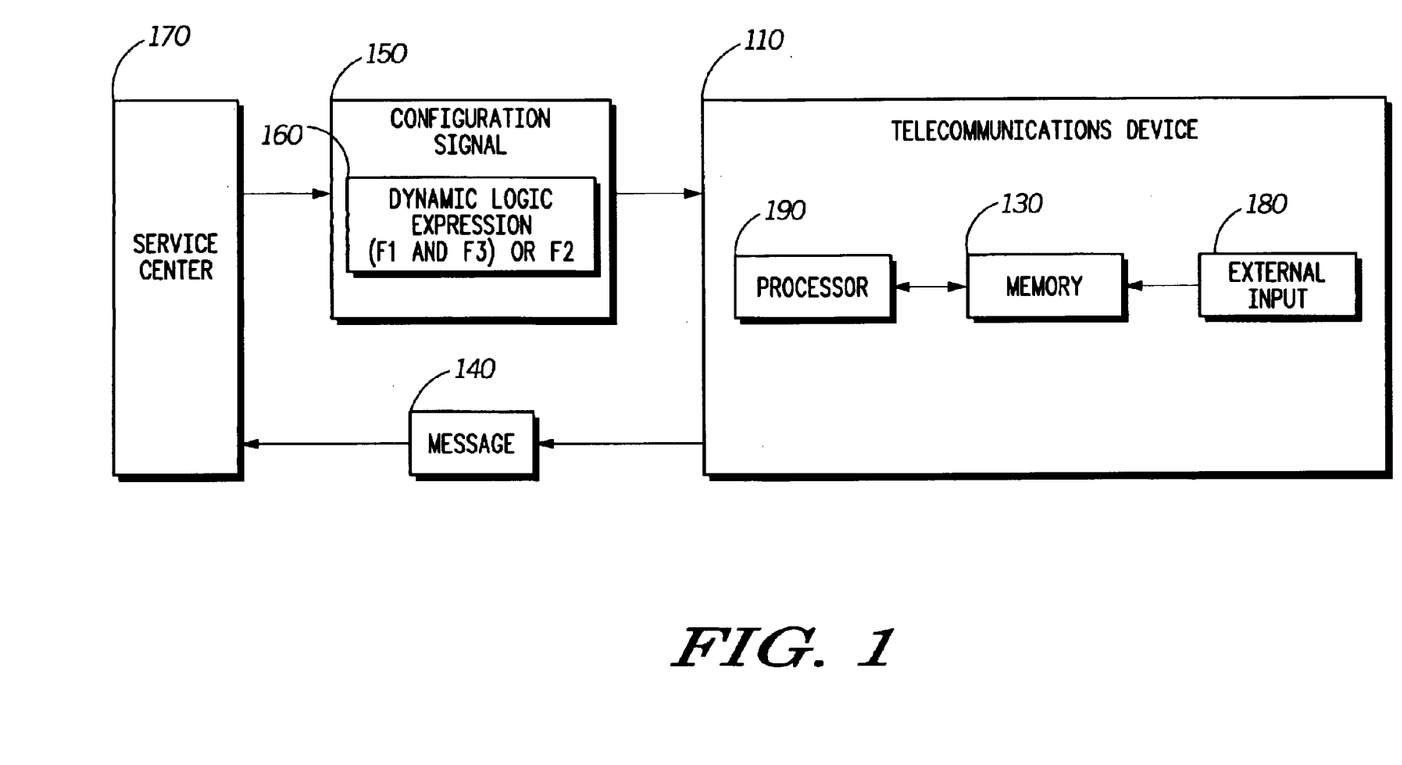
FIG. 1 illustrates a block diagram of a method and system for controlling message transmission by a telecommunications device in accordance with an embodiment of the invention.

FIG. 1 outlines a method for controlling message transmission by a telecommunications device 110. The telecommunications device 110 can be any device that communicates by electronic transmission of signals. The telecommunications device 110 preferably includes a memory 130, a processor 190 programmed to carry out the functions described herein, and an external input 180 to provide data to the processor 190 via external sensors, devices or other inputs (not shown). For example, in the telematics embodiment, external input 180 can receive data from devices or sensors for detecting vehicle speed, vehicle position (e.g., GPS or GLONASS), engine status, air bag status, windshield wiper status, door lock status, cargo status, status of other vehicle systems, and vehicle properties (e.g., vehicle model and year). Data provided to the processor 190 via the external input 180 preferably comprises data relating to conditions related to the transmission or acceptance of messages by the telecommunications device 110.

In one presently preferred embodiment, the telecommunications device 110 is a telematics device. Telematics devices include any vehicle communications device that combines wireless voice, data and/or location systems (e.g., GPS or GLONASS) to provide location-specific security, information, productivity and/or in-vehicle entertainment services to drivers and their passengers. Telematics systems generally comprise a plurality of in-vehicle telematics devices wirelessly connected to a service center. The telematics device generally communicates location-specific information to the service center, and in turn the service center communicates with the telematics device via a cellular telephone interface.

Examples of telematics systems include General Motors Corporation's ONSTAR® system and Ford Motor Company's RESCUE® system.

The method described herein can particularly enhance Floating Car Data (FCD) systems, which detect traffic flow using autonomously reporting vehicles. For example, telematics devices providing FCD service frequently check certain conditions, based on the sensors available to the device (e.g., vehicle location and speed). If defined threshold values are passed, a message is sent to a service center. This message contains data that allows the service center to deduct information about the traffic flow in the vehicle's vicinity. For example, telematics devices installed on vehicles at a particular location can be instructed by use of message triggers to send messages to a service center if the vehicle exceeds a certain speed or drops below a certain speed. By receiving such messages from various vehicles traveling in an area, the service center can compile data relating to traffic conditions. If the trigger conditions are not set correctly, a vehicle might report too often or too rarely, or it might report under wrong conditions, thus adding little or no value to the service center's traffic information. It is therefore preferred that an FCD system be kept as flexible as possible. In addition, the method described herein can be applied to other telecommunications and telematics applications, for example, remote vehicle/equipment diagnostics, fleet management, and individual health watch (e.g., blood pressure monitors and the like).

A trigger configuration signal 150 is transmitted to the telecommunications device 110 and preferably stored in memory 130. The trigger configuration signal 150 is an electronic message that instructs the telecommunications device 110 as to the triggers or combination of triggers to be applied at a given time. Each message trigger is an expression that defines one or more conditions that must be satisfied for the telecommunications device 110 to transmit a message 140 to a service center 170. The conditions are preferably based upon fixed parameters (e.g., vehicle or system properties) or dynamic values (e.g., speed, temperature, system status, or position) available to the telecommunications device 110 via sensors and/or other data input. The trigger configuration signal 150 comprises a dynamic logic expression 160 preferably having one or more operands (F1, F2 and F3). Each of the operands preferably defines a condition associated with the transmission of a message.

A dynamic logic expression is a logic expression that can be modified by changing operators and operands. The dynamic logic expression 160 is preferably a Boolean expression. The logic expression is dynamic, and both operators and operands can preferably be continuously changed to allow many or all logical combinations of available triggers. In the example shown in FIG. 1, the dynamic logic expression 160 is (F1 AND F3) OR F2. Application of this expression results in a message being sent if the dynamic logic expression yields a TRUE result. Because the logic expression is dynamic, it can be modified by changing operators and/or operands. For example, a different trigger configuration signal could be sent to modify the dynamic logic expression to (F2 OR F4) AND F6. This new dynamic logic expression changes the trigger configuration.

The operands of the dynamic logic expression (F1, F2, F3, etc.) preferably comprise sub-expressions defining conditions associated with the transmission of a message. The operands are typically arithmetic expressions, comparisons or functions relating to such data. For example, F1 could be "Speed(t1)>50," where "Speed(t1)" refers to a fixed association with an in-vehicle sensor recording in memory, where "(t1) designates the position in memory where a historic speed value can be found and "Speed" is a function having time as a parameter. The symbol ">" is the comparison operator and "50" is a threshold value to be applied.

Expressions defining conditions associated with the transmission of a message can be simple expressions or can be based on complex logical and arithmetic functions. For example, telematics systems typically include a number of vehicle and system interfaces that provide data to a telematics controller unit relating to traffic, weather, location or vehicle conditions, for example, vehicle speed, vehicle location (e.g., GPS or GLONASS data), status of vehicle systems (e.g., engine, windshield wipers, air bags, door locks, etc.), and vehicle properties (e.g., vehicle model and year). Time is also frequently a component of expressions defining conditions associated with the transmission of a message. Some conditions are satisfied if certain conditions remain valid over time (e.g., a condition may require that engine temperature remain over 150 degrees for more than one minute). Expressions defining conditions associated with the transmission of a message may include more complex arithmetic expressions, such as, for example, average, maximum, minimum, etc.

Preferably, the trigger configuration signal 150 is transmitted from a service center 170 that communicates with a plurality of telecommunications devices. A service center is a communications center that sends and receives electronic messages from a plurality of telecommunications devices.

The telecommunications device 110 receives the trigger configuration signal 150 and preferably stores the trigger configuration signal in the memory 130. The dynamic logic expression 160 of the trigger configuration signal 150 is applied by telecommunications device 110, and a message 140 is transmitted by the telecommunications device 110 if the dynamic logic expression 160 is satisfied. The dynamic logic expression 160 is preferably interpreted and applied by the processor 190 using an expression interpreter programmed in the telecommunications device 110. The processor 190 preferably receives data relating to conditions associated with message transmission from the external input 180 and/or memory 130. The message 140 is preferably transmitted by the telecommunications device 110 and received by a service center 170 that communicates with a plurality of telecommunications devices.

Figure 2A:
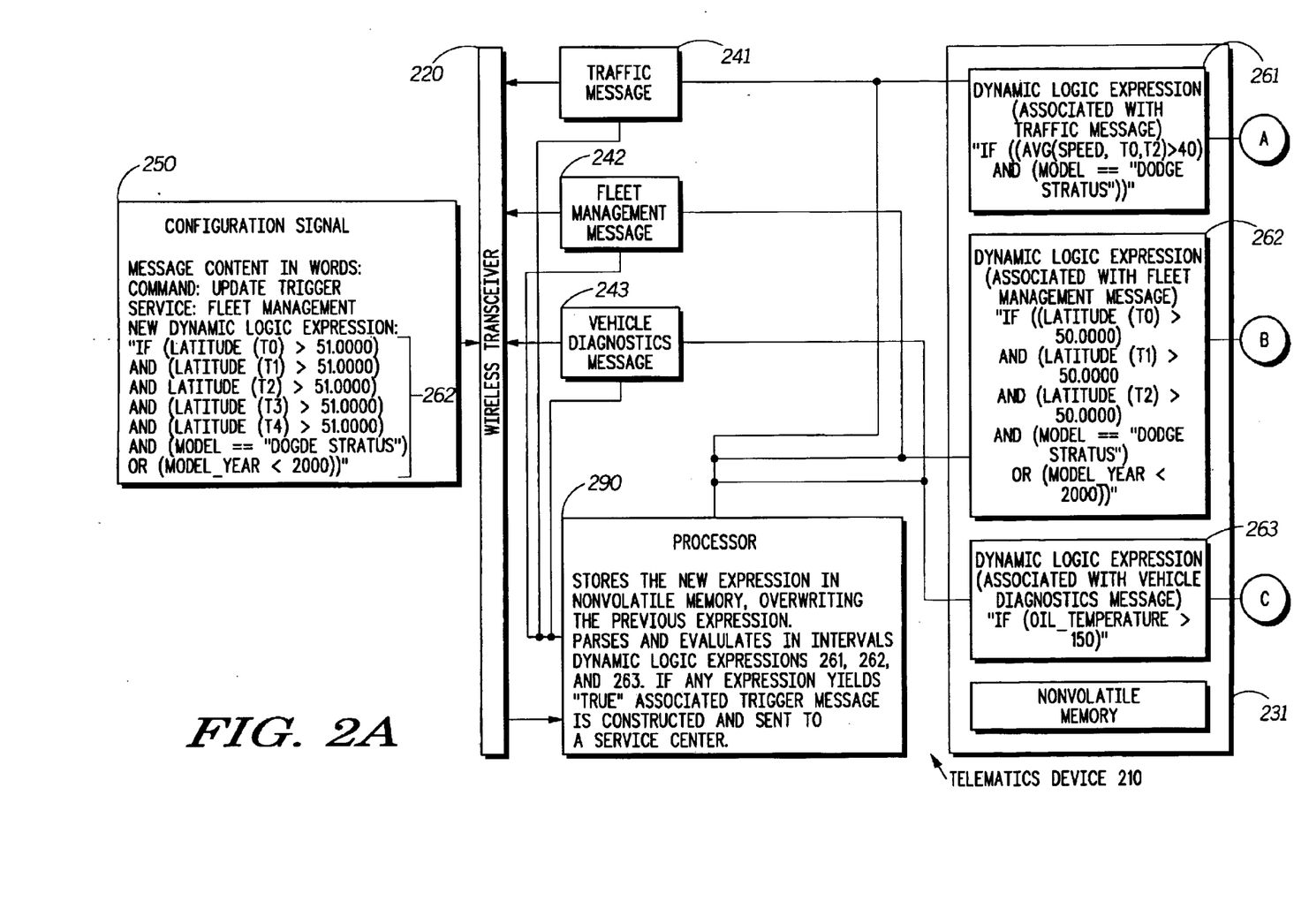
FIG. 2 illustrates a block diagram of an example of a method and system for controlling message transmission by a telematics device in accordance with an embodiment of the invention.
Figure 2B:
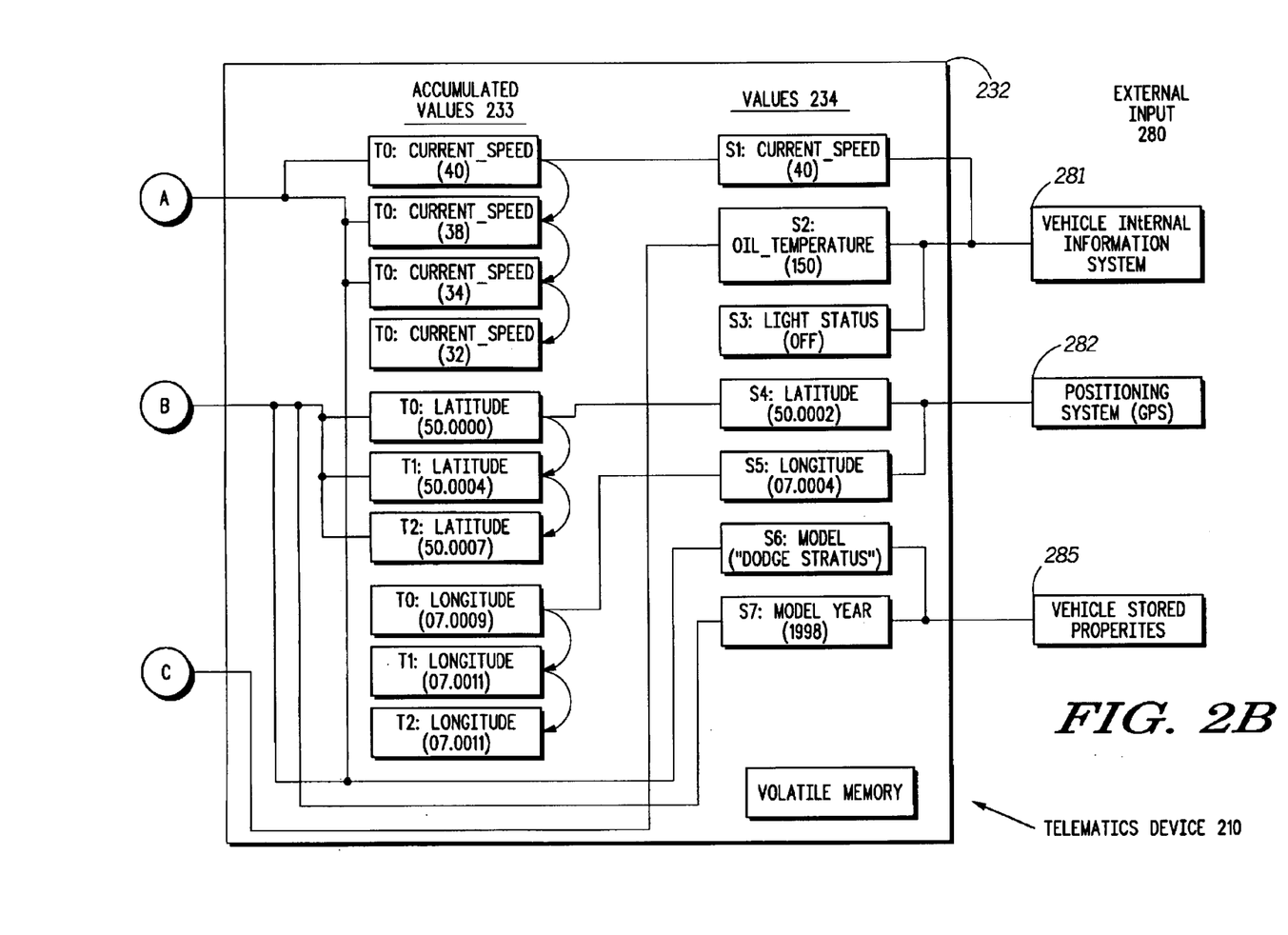

FIG. 2 outlines an example of a method and system for controlling transmission of messages by a telematics device 210. The telematics device 210 preferably includes a wireless transceiver 220 that receives a configuration signal 250 from a service center (not shown). The configuration signal 250 preferably comprises a command instructing the device to update its trigger configuration. The command preferably specifies a particular telematics functions to which the trigger configuration signal applies (e.g., traffic reporting, fleet management, vehicle diagnostics, etc.). The configuration signal 250 comprises a dynamic logic expression 262. The configuration signal 250 instructs the telematics device 210 to update a trigger configuration so as to transmit a message relating to fleet management if the dynamic logic expression 262 is satisfied.

The telematics device 210 preferably can be controlled using one or more dynamic logic expressions 261–263. Each of dynamic logic expressions 261–263 is associated with a different telematics function (e.g., traffic reporting, fleet management, and vehicle diagnostics). Dynamic logic expression 261 is associated with the telematics function of traffic reporting. Dynamic logic expression 261 comprises the following expression: "If ((AVG(speed, T0, T2)>40) AND (Model="Dodge Stratus"))." The sub-expressions "(AVG(speed, T0, T2)>40)" and "(Model="Dodge Stratus")" are the operands of dynamic logic expression 261. Dynamic logic expression 262 relates to fleet management services and comprises the following expression: "If ((LATITUDE(T0)>50.0000) AND (LATITUDE(T2)>50.0000) AND (MODEL="Dodge Stratus") OR (MODEL_YEAR<2000))." Dynamic logic expression 263 relates to vehicle diagnostics and comprises the following expression: "If (OIL_TEMPERATURE>150)." A message is transmitted by the telematics device 210 relating to the applicable telematics function if the dynamic logic expression associated with that function is satisfied.

Processor 290 preferably stores the dynamic logic expressions 261–263 in a nonvolatile memory 231 overwriting any previous dynamic logic expression stored in the memory location allocated for the dynamic logic expression associated with the telematics function to which the new dynamic logic expression pertains. Optionally, processor 290 can detect that an additional memory area is needed for the evaluation of a dynamic logic expression 261–263, and allocate enlarged history required by the expression.

Processor 290 preferably parses and evaluates in intervals dynamic logic expressions 261–263. If any of the expressions yields a "TRUE" result, a message 241–243, preferably associated with the applicable telematics function, is sent to a service center (not shown). Processor 290 preferably evaluates dynamic logic expressions 261–263 using data stored in a volatile memory 232. In the example shown in FIG. 2, the data comprises information relating to vehicle speed, oil temperature, light status, vehicle position, vehicle model and year. The data stored in volatile memory 232 is preferably input via external input 280. In this example, external input 280 comprises vehicle internal information system 281, positioning system (e.g., GPS or GLONASS) 282, and vehicle stored properties 285. Vehicle internal information system 281 preferably comprises sensors (not shown) that collect data relating to internal vehicle systems (e.g., equipment temperature, equipment status, vehicle speed, etc.). Positioning system 282 preferably comprises a positioning system receiver (not shown) that collects data relating to the vehicle's position. Vehicle stored properties 285 preferably inputs data relating to vehicle properties (e.g., vehicle model, vehicle model year, etc.).

Volatile memory 232 preferably comprises memory locations storing current external input values 234 and accumulated values 233. Accumulated values 233 facilitate evaluation of arithmetic functions contained within the dynamic logic expressions (e.g., computing average vehicle speed or determining the direction in which the vehicle is traveling) by temporarily storing historical data.

The method described herein can also be applied to control input of telecommunications devices through configuration of message filters that define required conditions for a telecommunications device to accept a message. Message filters preferably facilitate the transmission of messages to a plurality of telecommunications devices where it is desired that only a portion of the devices accept and process particular messages.

Figure 3:
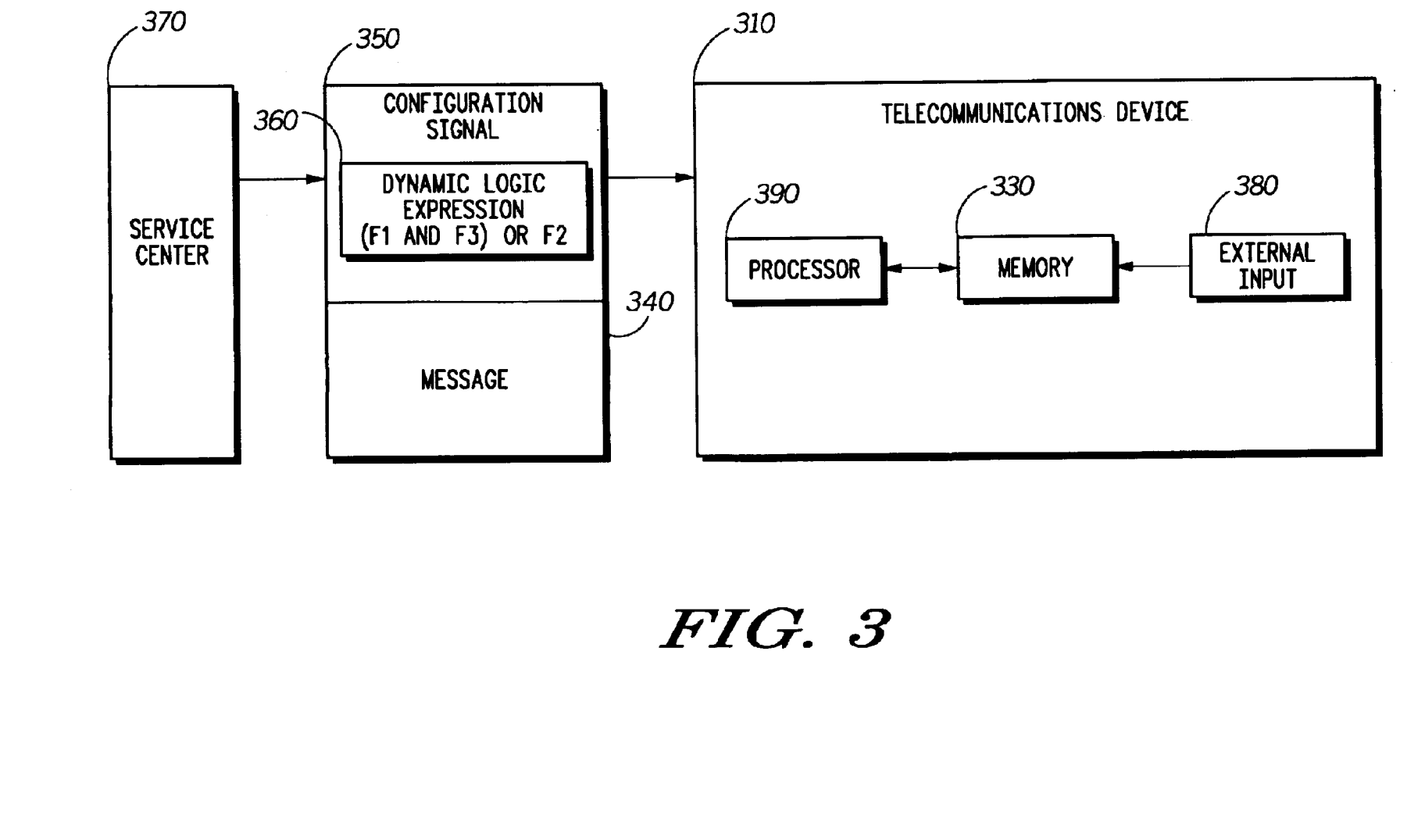
FIG. 3 illustrates a block diagram of a first method and system for controlling acceptance of messages by a telecommunications device in accordance with an embodiment of the invention.

FIG. 3 outlines a method and system for controlling acceptance of messages by a telecommunications device 310. The telecommunications device preferably includes a memory 330 and a processor 390 programmed to carry out the functions described herein.

A message filter configuration signal 350 is transmitted to the telecommunications device 310. The message filter configuration signal 350 comprises a dynamic logic expression 360 defining one or more conditions associated with the acceptance of a message. The dynamic logic expression preferably has one or more operands, each of the operands defining a condition associated with the acceptance of a message. The dynamic logic expression 360 is received by telecommunications device 310 and preferably stored in memory 330. A message 340 is also transmitted to the telecommunications device 310 and preferably stored in memory 330. Preferably, the configuration signal 350 is transmitted with message 340. Alternatively, the configuration signal 350 can be transmitted before message 340. The dynamic logic expression 360 is interpreted and applied, preferably by processor 390 utilizing data relating to conditions associated with the acceptance of a message input to the processor 390 via an external input 380 and/or memory 330. The message 340 is accepted by the telecommunications device 310 if the dynamic logic expression 360 is satisfied.

The term accept means to receive and process the content of a message. If the configuration signal 350 is transmitted with the message 340, both the configuration signal 350 and the message 340 will preferably be received by the telecommunications device 310. The message 340 will be processed and acted upon if the dynamic logic expression 360 is satisfied. If the dynamic logic expression 360 is not satisfied, the message 340 will be ignored or discarded.

The following are examples of simple expressions defining conditions associated with the acceptance of a message applicable to the telematics embodiment:

IF (VEHICLE_MODEL="DODGE STRATUS") AND (OIL_TEMPERATURE>80)

IF (CARGO_TEMPERATURE<50) AND (LATITUDE>5099237).

Message filter configuration signals are preferably transmitted along with associated messages. If the expression yields a TRUE result, the telecommunications device would accept the associated message, if FALSE, the telecommunications device would ignore the message. Different filter configuration signals can be sent to modify the dynamic logic expression to change the filter configuration.

The message filter configuration signal 350 is preferably transmitted from a service center 370 that communicates with a plurality of telecommunications devices. Likewise, the message 340 is preferably transmitted to the telecommunications device 310 from a service center 370 that communicates with a plurality of telecommunications devices.

In a presently preferred embodiment, the telecommunications device 310 is a telematics device, and the message 340 transmitted to the telematics device comprises information exchanged between the telematics device and the service center.

Figure 4:
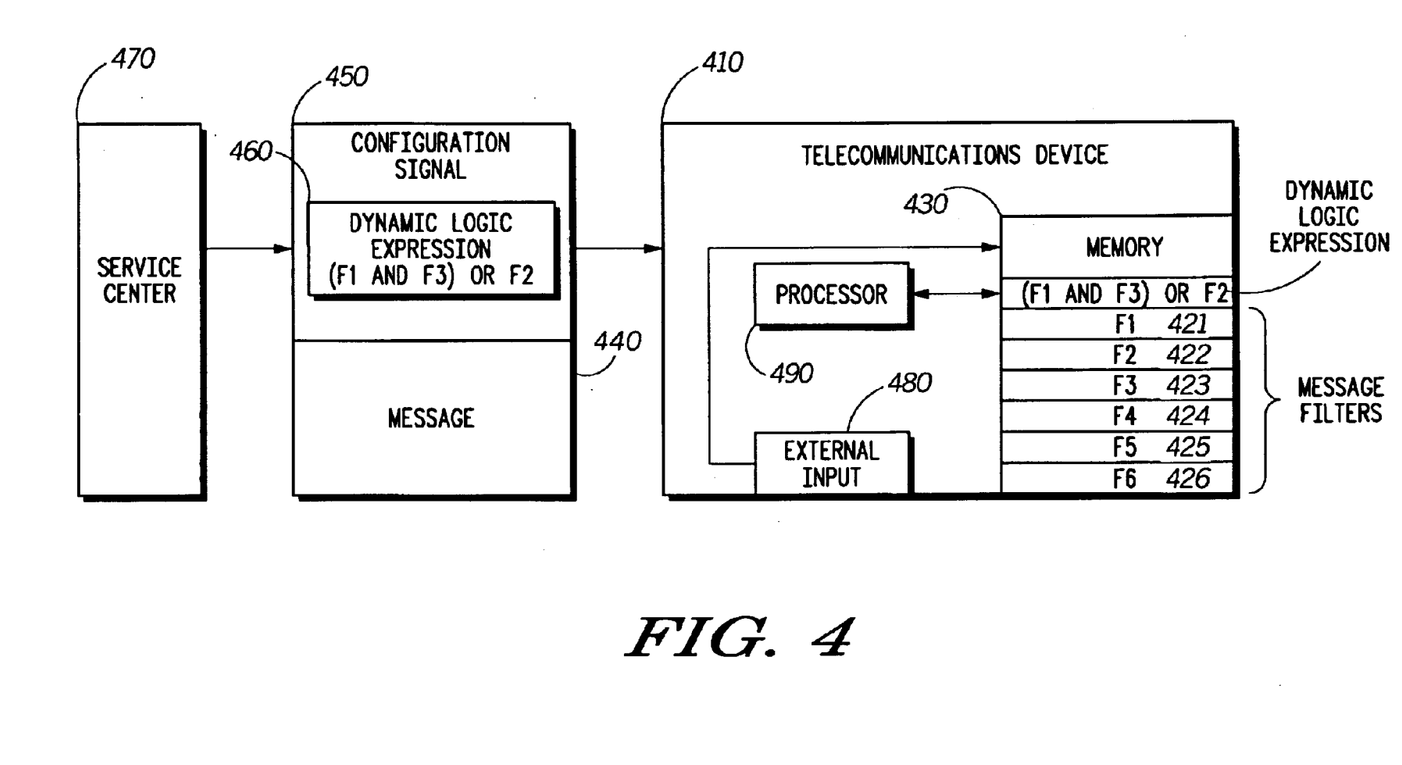
FIG. 4 illustrates a block diagram of a second method and system for controlling acceptance of messages by a telecommunications device in accordance with an embodiment of the invention.

FIG. 4 outlines an alternative embodiment of the method and system for controlling a telecommunications device 410 using one or more expressions 421–426 stored in memory 430. The telecommunications device preferably includes a processor 490 programmed to carry out the functions described herein.

In this embodiment, one or more expressions 421–426, each defining a condition associated with the acceptance of a message are stored in memory 430. A message filter configuration signal 450 is transmitted to the telecommunications device 410. The message filter configuration signal 450 comprises a dynamic logic expression 460 preferably having one or more operands, each of the operands designating a location in memory for one of the expressions 421–426. The dynamic logic expression 460 is received by telecommunications device 410 and preferably stored in memory 430. A message 440 is also transmitted to the telecommunications device 410 and preferably stored in memory 430. Preferably, the configuration signal 450 is transmitted with message 440. Alternatively, the configuration signal 450 can be transmitted before message 440. The dynamic logic expression 460 is interpreted and applied, preferably by processor 490 utilizing data relating to conditions associated with the acceptance of a message input to the processor 490 via an external input 480 and/or memory 430. The message 440 is accepted by the telecommunications device 410 if the dynamic logic expression 460 is satisfied.

The message filter configuration signal 450 is preferably transmitted from a service center 470 that communicates with a plurality of telecommunications devices. Likewise, the message 440 is preferably transmitted to the telecommunications device 410 from a service center 470 that communicates with a plurality of telecommunications devices.

Therefore, an improved method and system for controlling a telecommunications device is provided to overcome the disadvantages of the prior art. Systems and devices utilizing the methods described herein are not limited by the preprogramming of the telecommunications device. The method and system described herein allows deployed telecommunications devices to be remotely reconfigured with numerous logical combinations of available filters and triggers. The problem of updating filters and triggers using a narrow-bandwidth signaling channel can be overcome by transmitting the expression itself, thus providing great flexibility in controlling the behavior of already deployed telecommunications devices. By transmitting dynamic expressions to telecommunications devices, the behavior of the device can be changed without requiring the customer to visit a dealership or a service center. The range of possible changes compared to existing solutions is significantly enlarged. Service quality can be raised, and service maintenance and operations can be reduced. Furthermore, new services can be provided by already deployed telecommunications devices by enlarging the variety of triggers and filters available.

Although the invention has been described with reference to specific embodiments, it will be understood by those skilled in the art that various changes may be made without departing from the spirit or scope of the invention. For instance, the numerous details set forth herein such as, for example, use of the method and system in connection with telematics systems and floating car data services, are provided to facilitate the understanding of the invention and are not provided to limit the scope of the invention. Furthermore, it is intended that the method and system described here in can be used for a number of telecommunications devices such as, for example: communications enabled mobile computing devices, autonomous navigation systems, mobile phones, communication enabled medical equipment, medical and emergency alert systems, burglar and emergency alarm systems, and automobile alarm and theft deterrence systems. Accordingly, the disclosure of embodiments of the invention is intended to be illustrative of the scope of the invention and is not intended to be limiting. It is intended that the scope of the invention shall be limited only to the extent required by the appended claims.

We claim:

1. A method for controlling message transmission by a telecommunications device to a remote service center comprising the steps of:

receiving a trigger configuration signal from the remote service center comprising a dynamic logic expression defining one or more conditions associated with transmission of a message;

applying the dynamic logic expression; and transmitting the message from the telecommunications device to the remote service center if the dynamic logic expression is satisfied.

2. The method of claim 1 wherein the dynamic logic expression has one or more operands, each of the one or more operands defining a condition associated with the transmission of the message.

3. The method of claim 1 further comprising the steps of:

receiving a different trigger configuration signal from the remote service center comprising a different dynamic logic expression defining one or more conditions associated with transmission of a second message;

applying the different dynamic logic expression; and transmitting the second message from the telecommunications device to the remote service center if the different dynamic logic expression is satisfied.

4. The method of claim 1 wherein the telecommunications device is a telematics device.

5. The method of claim 4 wherein the message transmitted by the telematics device comprises data relating to traffic, weather, location, vehicle or cargo conditions.

6. A method for controlling message acceptance by a telecommunications device comprising the steps of:

receiving a filter configuration signal from a remote service center comprising a dynamic logic expression defining one or more conditions associated with acceptance of a message;

applying the dynamic logic expression; and accepting the message if the dynamic logic expression is satisfied.

7. The method of claim 6 wherein the dynamic logic expression has one or more operands, each of the one or more operands defining a condition associated with the acceptance of a message.

8. The method of claim 6 further comprising receiving the message with the filter configuration signal.

9. The method of claim 6 further comprising the steps of:

receiving a different filter configuration signal from a remote service center comprising a different dynamic logic expression defining one or more conditions associated with acceptance of a second message;

applying the different dynamic logic expression; and accepting the second message if the different dynamic logic expression is satisfied.

10. The method of claim 6 wherein the telecommunications device is a telematics device.

11. A method for controlling communications by a telecommunications device with a remote service center comprising the steps of:

receiving a trigger or message configuration signal from the remote service center comprising a dynamic logic expression defining one or more conditions associated with transmission or acceptance of a message;

applying the dynamic logic expression; and transmitting to the remote service center or accepting the message if the dynamic logic expression is satisfied.

12. A telecommunications device comprising a processor programmed to apply a dynamic logic expression from a remote service center defining one or more conditions associated with transmission of a message and to transmit the message to the remote service center if the dynamic logic expression is satisfied.

13. The telecommunications device of claim 12 wherein the dynamic logic expression has one or more operands, each of the one or more operands defining a condition associated with the transmission of the message.

14. The telecommunications device of claim 12 further comprising a transceiver for receiving a configuration signal comprising the dynamic logic expression and transmitting the message.

15. The telecommunications device of claim 12 further comprising a memory for storing the dynamic logic expression.

16. The telecommunications device of claim 12 wherein the telecommunications device is a telematics device.

17. The telecommunications device of claim 16 further comprising inputs for receiving data relating to traffic, weather, location, vehicle, or cargo conditions, and wherein the one or more conditions associated with the transmission of the message are based upon data relating to traffic, weather, location, vehicle, or cargo conditions.

18. A telecommunications device comprising a processor programmed to apply a dynamic logic expression from a remote service center defining one or more conditions associated with acceptance of a message and to accept the message if the dynamic logic expression is satisfied.

19. The telecommunications device of claim 18 wherein the dynamic logic expression has one or more operands, each of the one or more operands defining a condition associated with the acceptance of the message.

20. The telecommunications device of claim 18 further comprising a transceiver for receiving a configuration signal comprising the dynamic logic expression and transmitting the message.

21. The telecommunications device of claim 18 further comprising a memory for storing the dynamic logic expression.

22. The telecommunications device of claim 18 wherein the telecommunications device is a telematics device.

23. A telecommunications system comprising:

a service center that wirelessly communicates with a plurality of telecommunications devices;

at least one telecommunications device comprising a processor programmed to apply a dynamic logic expression from the remote service center defining one or more conditions associated with transmission of a message to the remote service center and to transmit the message if the dynamic logic expression is satisfied.

24. A telecommunications system comprising:

a service center that wirelessly communicates with a plurality of telecommunications devices;

at least one telecommunications device comprising a processor programmed to apply a dynamic logic expression from the remote service center defining one or more conditions associated with acceptance of a message and to accept the message if the dynamic logic expression is satisfied.

25. A telematics system comprising:

a plurality of telematics devices, each of the plurality of telematics devices comprising a processor programmed to apply a first dynamic logic expression defining one or more conditions associated with acceptance of a first message and to accept the first message if the first dynamic logic expression is satisfied, and to apply a second dynamic logic expression defining one or more conditions associated with transmission of a second message and to transmit the second message if the second dynamic logic expression is satisfied; and a remote service center for communicating with the plurality of telematics devices by transmitting configuration signals to the plurality of telematics devices, the configuration signals comprising the first and second dynamic logic expressions, by transmitting the first message to the plurality of telematics devices, and by receiving the second message from the plurality of telematics devices.

* * * * *

UNITED STATES PATENT AND TRADEMARK OFFICE
CERTIFICATE OF CORRECTION

PATENT NO. : 6,704,564 B1
DATED : March 9, 2004
INVENTOR(S) : Lange et al.

It is certified that error appears in the above-identified patent and that said Letters Patent is hereby corrected as shown below:

Column 9,
Line 7, after "of:", insert -- providing a telecommunications device that can be continuously wirelessly reconfigured by a dynamic logic expression sent by the remote service center defining conditions associated with transmission of a message; --
Line 15, after "satisfied", insert -- wherein the receiving, applying, and accepting steps can occur continuously. --
Line 34, after "of:", insert -- providing a telecommunications device that can be continuously wirelessly reconfigured by a dynamic logic expression sent by the remote service center defining conditions associated with tranmission of a message without returning the telecommunications device to the service center for reprogramming; --
Line 35, after "receiving", insert -- one or more of --
Line 35, after "trigger", delete "or" and add -- and --
Line 35, after "message", insert -- filter --
Line 41, after "center" insert -- if a trigger dynamic logic expression is satisfied --
Line 41, delete "or" and insert -- and --
Line 42, after "if" delete "the" and insert -- a message filter --
Line 42, after "satisfied" insert -- wherein the receiving, applying, and transmitting steps can occur continuously. --
Line 43, after "device" insert -- that can be continuously wirelessly reconfigured by a dynamic logic expression sent by a remote service center defining conditions associated with transmission of a message with returning the telecommunications device to the service center for reprogramming, the telecommunications device --
Line 44, after "apply" delete "a" and insert -- the --
Line 44, after "from" delete "a" and insert -- the --

Column 10,
Line 5, after "device" insert -- that can be continuously wirelessly reconfigured by a dynamic logic expression sent by a remote service center defining conditions associated with transmission of a message without returning the telecommunications device to the service center for reprogramming, the telecommunications device --
Line 6, after "apply" delete "a" and insert -- the --
Line 6, after "from" delete "a" and insert -- the --
Line 44, after "devices," insert -- that can be continuously wirelessly reconfigured by a dynamic logic expression sent by remote service center defining conditions associated with transmission of a message without returning the telecommincations device to the service for reprogramming, the telecommunications device, --

UNITED STATES PATENT AND TRADEMARK OFFICE
CERTIFICATE OF CORRECTION

PATENT NO. : 6,704,564 B1
DATED : March 9, 2004
INVENTOR(S) : Lange et al.

It is certified that error appears in the above-identified patent and that said Letters Patent is hereby corrected as shown below:

Column 10 (cont'd),
Line 36, after "device" insert -- that can be continuously wirelessly reconfigures by a dynamic logic expression sent by a remote service center defining conditions associated with transmission of a message without returning the telecommunications device to the service center for reprogramming, the telecommunications device --
Line 37, after "apply" delete "a" and insert -- the --

Signed and Sealed this

Seventeenth Day of August, 2004

JON W. DUDAS
*Acting Director of the United States Patent and Trademark Office*